United States Patent [19]
Gensler

[11] Patent Number: 6,009,631
[45] Date of Patent: Jan. 4, 2000

[54] GAUGE FOR MEASURING CHANGES IN THE LENGTH OF A PERIMETER

[76] Inventor: William G. Gensler, 4020 E. Coronado Dr., Tucson, Ariz. 85718

[21] Appl. No.: 09/030,199

[22] Filed: Feb. 25, 1998

Related U.S. Application Data

[63] Continuation-in-part of application No. 08/607,694, Feb. 27, 1996, abandoned.

[51] Int. Cl.[7] ..................................................... G01B 5/08
[52] U.S. Cl. ......................................... 33/555.4; 33/555.1
[58] Field of Search ................................ 33/555.4, 555.1, 33/700, 787, 790, 561.2, 514.1, 514.2

[56] References Cited

U.S. PATENT DOCUMENTS

| | | |
|---|---|---|
| 1,385,139 | 7/1921 | MacDougal . |
| 1,978,682 | 10/1934 | Marvin ..................................... 33/555.4 |
| 2,562,749 | 7/1951 | Speer ........................................ 33/555.4 |
| 2,609,610 | 9/1952 | Elmes ....................................... 33/555.4 |
| 4,914,821 | 4/1990 | Hurt ......................................... 33/555.4 |
| 5,067,246 | 11/1991 | Hesske et al. . |
| 5,174,030 | 12/1992 | Clot et al. ................................ 33/555.4 |

FOREIGN PATENT DOCUMENTS

| | | | |
|---|---|---|---|
| 525850 | 8/1957 | Italy ........................................ 33/555.4 |
| 46-3350 | 1/1971 | Japan ...................................... 33/555.4 |
| 131095 | 1/1960 | U.S.S.R. ................................. 33/555.4 |
| 1744419 | 6/1992 | U.S.S.R. ................................. 33/555.4 |
| 896188 | 5/1962 | United Kingdom ................... 33/555.4 |

OTHER PUBLICATIONS

Series 3, Well Type Dendrometer, William G. Gensler, 1990.
Series 4, Well Type Dendrometer, William G. Gensler, no date.

*Primary Examiner*—Andrew Hirshfeld

[57] ABSTRACT

This gauge measures change in the length of the perimeter of stems and branches of trees and plants. The principal elements of the gauge are a band, concentric tubes, one mechanism to exert constant tension on the band and a second mechanism to press the gauge against the perimeter. The tubes are connected to the band such that changes in the length of the perimeter change the position of one tube with respect to the other. Readout of the position of the tubes is accomplished visually from scales located on the tubes or with a caliper inserted along a guide in the outer tube.

1 Claim, 10 Drawing Sheets

GAUGE FOR MEASURING CHANGES IN THE LENGTH OF A PERIMETER

This application is a continuation-in-part of U.S. patent application Ser. No. 08/607,694 filed on Feb. 27, 1996, now abandoned.

FIELD OF THE INVENTION

This invention is primarily a gauge to measure changes in the length of the perimeter of stems and branches of trees and plants.

DESCRIPTION OF PRIOR ART

U.S. Pat. No. 1,385,139, D. T. MacDougal, Jul. 19, 1921.

This gauge comprises a wire supported on a series of struts spaced around the perimeter. Movement of the struts imparts movement to the wire. One end of the wire is connected to a scale mounted on a plate fixed to the tree. The other end of the wire connects to a pointer juxtaposed against the scale on a rotating drum. Changes in the perimeter length, change the strut position. This changes the wire position and then the pointer position. Wire tension varies as the strut position varies. By contrast, in the applicant's gauge, no intermediate elements such as struts are used. Furthermore, the tension on the band placed around the perimeter is achieved with a constant force spring which does not change with increase in perimeter length.

U.S. Pat. No. 5,067,246, Benno Hesske, Franz Adrnae and Peter Weber, Nov. 26, 1991

This invention comprises a band and rotating drum. One end of the band is attached to a non rotating support and the other end is attached to the rotating drum. A scale on the rotating drum is juxtaposed against a scale on the non-moving support. As the perimeter changes in length, the drum rotates and changes the position of one scale relative to the other. Tension on the band is achieved by a spring located on the drum.

The invention has two disadvantages. The use of a coil type extension spring to obtain tension on the band leads to a variable tension magnitude over the range of operation. Excessive force will cause an invagination of the stem in the region of the band. This means that over the range of operation of the gauge, the influence of such excessive force introduces biological and physical uncertainty into the measurement. This problem is especially pronounced in application of the gauge to younger trees which have a "skin" rather than "bark." The applicant's invention solves this problem by exerting a constant tension on the band through the use of a constant force spring.

The second disadvantage of this gauge is the use of a specialized band structure, namely, a hook and eye on the band. This requires that each band be customized to the particular tree under examination. The applicant's gauge uses a homogeneous band structure which fits all size trees.

U.S. Pat. No. 2,562,749, J. R. Speer, Jul. 31, 1951

This gauge employs a band which is maintained under constant tension by means of a weight connected to one end of the band. The use of a weight is an obvious method of maintaining a constant tension. Gravitational force from the weight is exerted in a single direction. Transfer of this directionality is achieved by the use of a rotating drum and flexible member which transfers the force to any desired direction. In this sense, the weight itself is not the constant force mechanism. The mechanism is comprised of the weight, the rotating drum and the flexible member. In the applicant's gauge, the direction of the constant force from the spring is parallel to the band no matter what the orientation of the band. In an outdoor application the use of a weight suffers from a very serious problem. The presence of wind causes the weight to swing back and forth over a range of 360 degrees. This introduces a wide range of structural, reliability and material selection problems. A wind shield can be used to enshroud the weight. If the gauge is to be used in a single gravitational orientation, the wind shield can be sized to cover but not touch the weight. When the weight scrapes the side of the wind shield, the maintenance of constant tension becomes moot. In applications to trees and branches the orientation of the gauge ranges from vertical to horizontal. This makes the use of a weight and wind shield feasible for gauge orientation only near vertical. In the applicant's gauge, a constant force spring operates in any orientation and is not influenced by wind.

U.S. Pat. No. 5,174,030, R. Clot et al, Dec. 29, 1992.

This gauge uses a spring loaded band. No mention is made in the specification nor the claims of constant tension on the band. The drawings in the patent do not specify but suggest a conventional circular extension spring is employed. This has the disadvantage of an increasing tension as the tree or plant grows.

U.S. Pat. No. 4,914,82, R. D. Hurt, Apr. 10, 1990.

This gauge employs a hairpin spring to maintain tension on the band. This results in a non constant tension on the band with the attendant disadvantage previously described.

Soviet Patent No. 1,744,419, Jun. 30, 1992

This gauge employs a compression spring to maintain tension on the band. This results in a non constant tension on the band with the attendant disadvantage previously described.

Japanese Patent Document 46-3350 and Italian Patent Document 525850

Both of these Documents illustrate apparatus in which a combination of inner and outer members are used to achieve a visual indication of changes in the length of a perimeter. The Japanese apparatus utilizes a variable force spring.

Series 3, Well Type Dendrometer, W. G. Gensler

The Series 3 gauge has been commercially available and in use in Arizona, New Mexico, California, Oregon and internationally in Spain, Germany, Switzerland, Korea, New Zealand, Alberta, British Columbia and Ontario since about 1990. The Series 3 gauge employs two concentric round tubes and a band wrapped around the perimeter. The outer tube is connected to one end of the band and the inner tube is connected to an intermediate point on the band. A compression spring is employed to maintain tension on the band. The distance or path length between the edge of the inner tube relative to the edge of the outer tube changes as the length of the perimeter changes. A change in this path length indicates a change in the length of the perimeter. An external length measuring device such as the rod of a caliper is inserted into the outer tube to measure this path length. The use of an external caliper results in very high resolution of perimeter length changes.

The Series 3 gauge has three problems: 1) a coupling between the force exerted on the band and the force required to press the gauge against the perimeter, 2) non constant band tension and 3) poor repeatability in the measurement of changes in perimeter length. Each of these problems will now be discussed.

The Series 3 gauge uses a single compression spring to maintain band tension and press the gauge against the perimeter. The force of this compression spring has two vector components: a component tangential to the perimeter and a component perpendicular to the perimeter. The tangential component maintains tension on the band. The perpendicular component presses the gauge against the perimeter. The perpendicular component is much smaller in magnitude than the tangential component. This introduces a problem in that the compression spring force must be set high enough to insure a perpendicular component of sufficient strength to press the gauge against the perimeter. But this results in an excessive tangential force as the tree grows. The applicant's gauge solves this problem by separating the mechanism for maintaining band tension from the mechanism for pressing the gauge against the perimeter. Two separate springs are employed, one spring to maintain tension on the band and one spring to press the gauge against the perimeter.

The Series 3 gauge has the problem of a non constant tension on the band. The applicant's gauge solves this problem with the use of a constant force spring.

The Series 3 gauge has a measurement problem. Successive and immediate measurements of the path length yield a relatively wide range of path length readings such that statistical averaging of the readings is necessary to yield an average value of path length. The source of the problem is twofold: 1) the location of the caliper on the edge of the outer tube varies from measurement to measurement because there is no unique point of reference or placement of the caliper on the edge of the round outer tube, 2) the variation in the path taken by the caliper rod within the outer tube varies from colinearity of the long axis of the rod with the axis of the outer tube to a pronounced angle between the long axis of the rod and the long axis of the outer tube. The applicant's gauge solves both of these problems by changing the shape of the outer concentric tube such that a structurally defined guide is formed. A square tube is employed whose inside comer opposite the location of the band defines a unique guide for the traverse of the rod of the caliper during successive measurements. The change from a round to a square tube is not trivial and introduced a further problem. Square tubes do not mate easily with round compression springs. However, the use of a constant force spring obviated this additional problem.

Series 4, Well Type Dendrometer, W. G. Gensler

The Series 4 gauge employs a weight to achieve a constant tension on the band. To prevent swinging in the wind, a wind shroud encircles and shields the weight. This limits the use of this gauge to near vertical applications wherein the weight does not scrape the side of the wind shroud. In the applicant's invention, the use of a constant force spring permits operation of the gauge in any orientation without the necessity of a wind shroud.

SUMMARY

The applicant's gauge is comprised of a gauge mounting assembly, a band, a constant force spring, two concentric tubes connected to the band and a pair of scales for visual observation of changes in the length of the perimeter. The gauge functions by converting changes in the length of the perimeter to changes in the relative position of the two concentric tubes. This change in relative position of the two tubes is measured either visually or by an external caliper inserted into the gauge.

The gauge has three characteristics that solve problems described in prior art gauges:

1) a constant force spring is used to maintain constant tension on the band. This permits the gauge to be used in any orientation. It also permits use of low band tension because the spring has only one function: to supply band tension.
2) a separate mechanism presses the gauge against the perimeter.
3) the outer tube shape forms a guide which permits unique and repeatable placement of a caliper rod within the outer tube.

The applicant's gauge is recently in use in the United States, Canada, Australia, New Zealand and Bermuda.

LIST OF REFERENCE NUMERALS

Parts Associated with the Outer Tube

Figure 1:
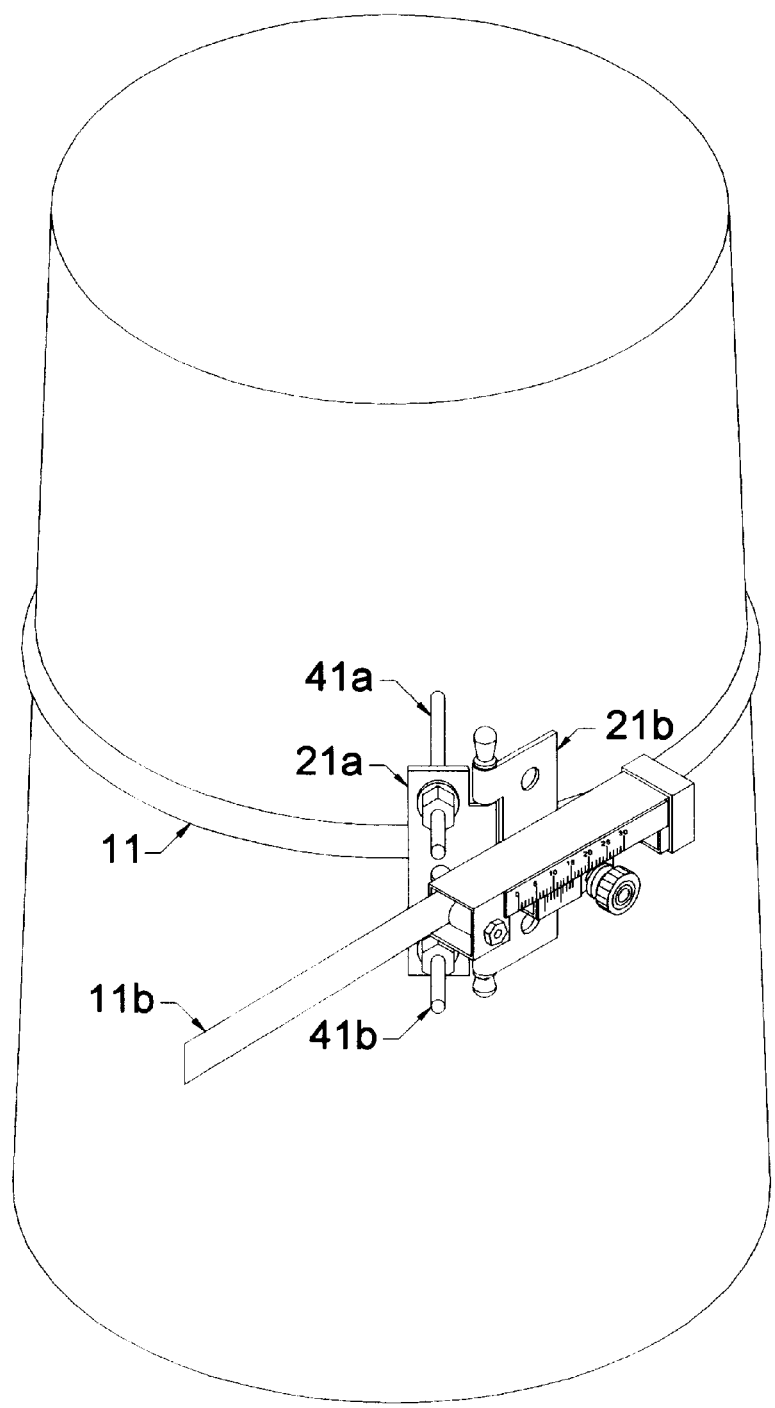
FIG. 1. Distant Isometric View of Gauge Mounted on a Tree.

11. Band
11a. First end of band
11b. Second end of band
12. Outer tube
14. Band retaining sleeve
16. Non moving scale Parts Associated with the Hinge 21a. Fixed hinge panel
21b. Swinging hinge panel
21c. Hinge rod
21d. Hinge rod cap
24. Hinge spring Parts Associated with the Mounting Assembly, Suffix "a" Refers to Upper, Suffix "b" Refers to Lower 41a,b. Mounting rod
42a,b. Rear mounting rod retaining nut
43a,b. Rear mounting rod washer
44a,b. Front mounting rod washer
45a,b. Lock washer
46a,b. Front mounting rod retaining nut
47a,b. Cap Nut Parts Associated with the Inner Tube 51. Inner Tube
51b. Inner tube plate
51c. Inner tube rod
51d. Band retaining ring
52. Thumb screw
53. Moving scale Parts Associated with the Constant Force Spring Assembly 61. Axle screw
62. Axle inner washer
63. Constant force spring
64. Brass Ring
65. Nylon Ring 66. Axle inner retaining nut
67. Axle outer washer
68. Axle stop washer
69. Axle outer retaining nut Guide for Insertion of the External Length Measuring Device 90. Guide
91. External length measuring device

DESCRIPTION OF THE PREFERRED EMBODIMENT

FIG. 1 shows a distant isometric view of the gauge mounted to the tree. One end of mounting rods 41a and 41b is screwed into the tree. The other end of mounting rods 41a and 41b is connected to fixed hinge panel 21a. The main body of the gauge is connected to swinging hinge panel 21b. The band first end 11a (not seen in this view) is connected to retaining sleeve 14 and moves clockwise about the perimeter. Band 11 traverses the perimeter and enters the front end of outer tube 12, passes through inner tube 51 and emerges from the back end of outer tube 12. Band second end 11b then hangs freely in the air.

Figure 2A:
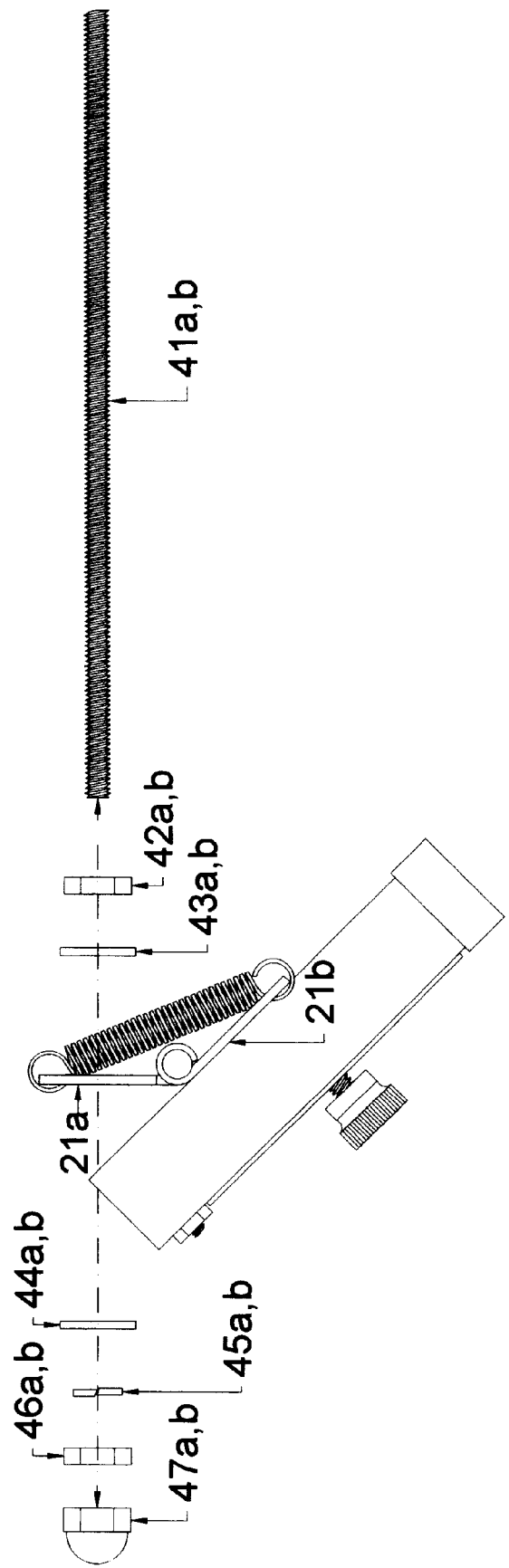
FIG. 2A is an Exploded View of Mounting Assembly and FIG. 2B is a Top View of Gauge Mounted and Pressed Against the Tree.

FIG. 2 shows an exploded top view of the method of connecting fixed hinge panel 21a to mounting rods 41a,b. By adjusting the location of mounting rod retaining nuts 42a,b and 46a,b, the long axis of outer tube 12 can be aligned tangential to the perimeter for any size tree. This permits band 11 to enter outer tube 12 at an angle of approach such that band 11 does not rub against the side of outer tube 12. This results in minimum friction and higher gauge resolution. Rear mounting washers 43a,b, front mounting washers 44a,b, and lock washers 45a,b may be used to facilitate mounting of the panel 21a to the mounting rods 41a,b. Also, cap nuts 47a,b may be used to cover the ends of the rods 41a,b.

Figure 2B:
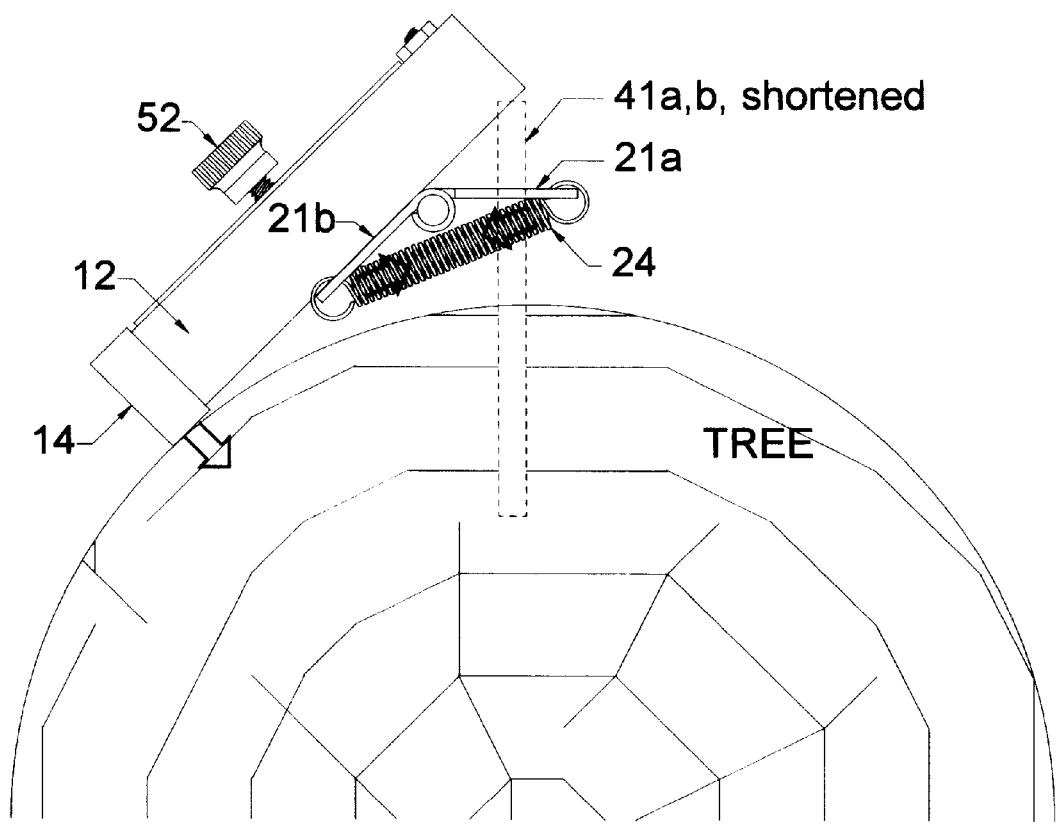

FIG. 2B shows a top view of the method wherein hinge spring 24 exerts a force (shown in bold arrowheads) between hinge panel 21a and hinge panel 21b. This force (shown in bold arrowhead) presses retaining sleeve 14 against the perimeter by permitting swinging hinge panel 21b to pivot about hinge rod 21c, shown with cap 21d thereon. Sleeve 14 is pressed against the perimeter before band 11 is installed. The force exerted by constant force spring 63 is expended exclusively to set tension on band 11. The drawings up to this point give an overall understanding of the gauge and the method of connecting the gauge to the tree.

Figure 3A:
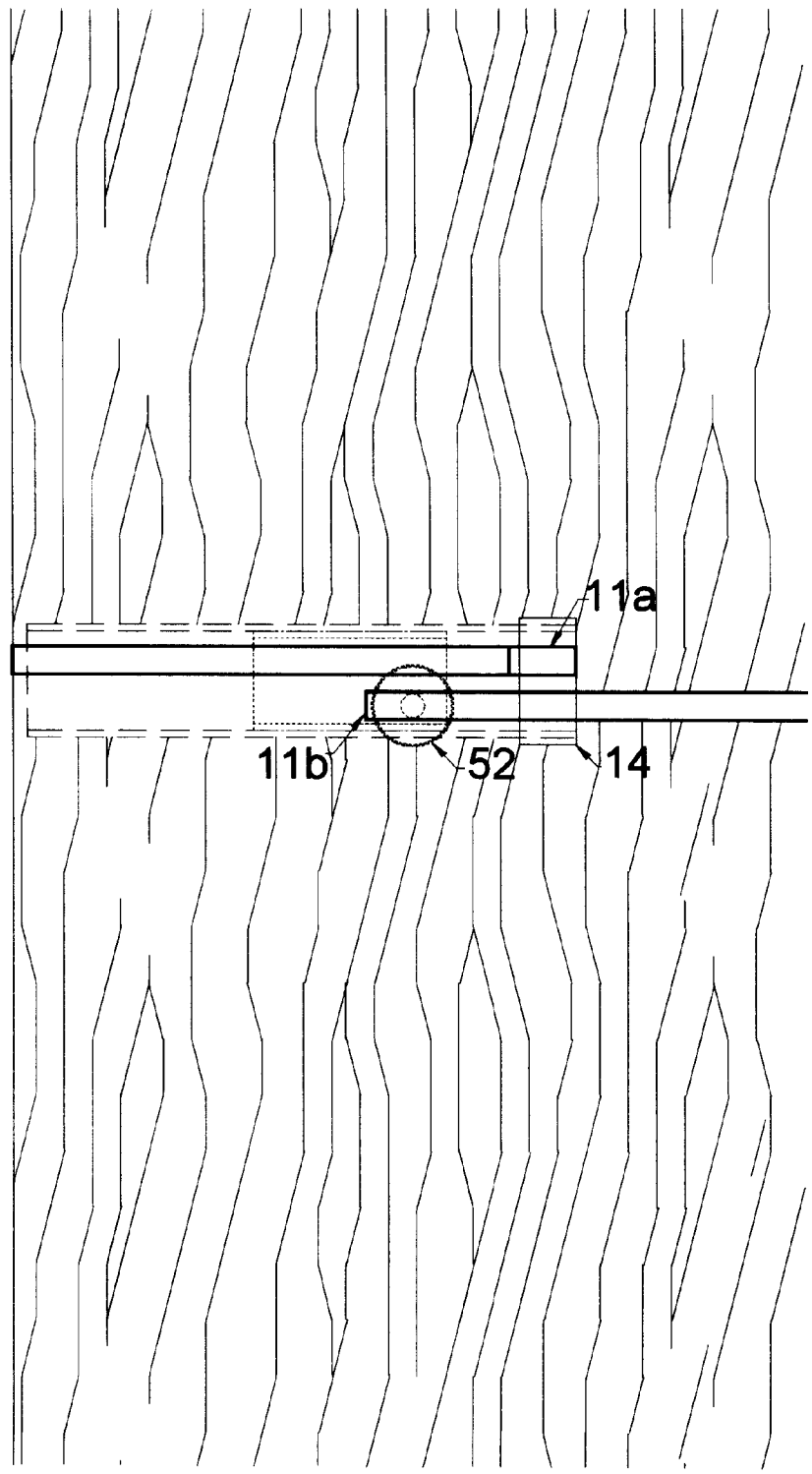
FIG. 3A is a side view of the band connections.
Figure 3B:
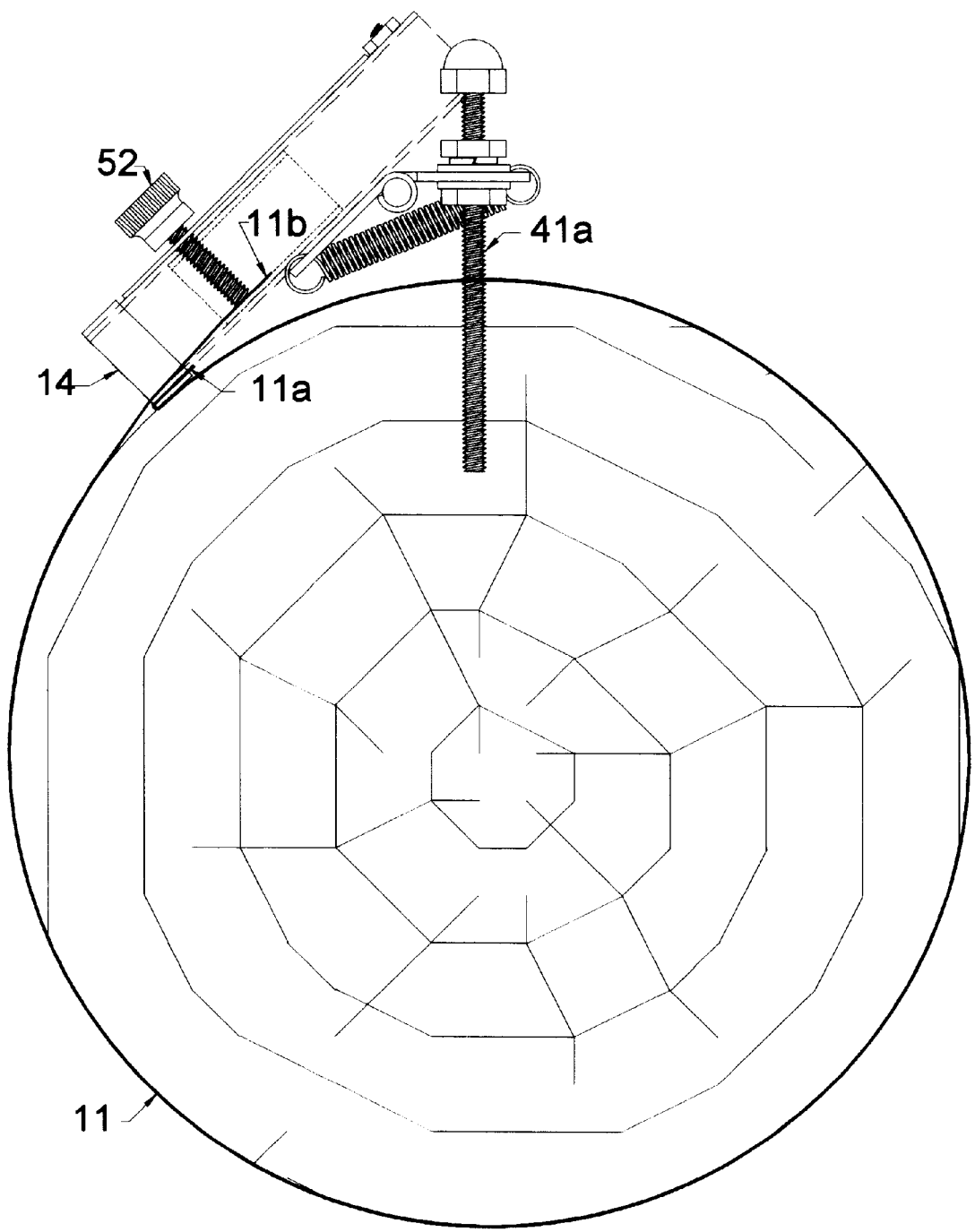
FIG. 3B is a top view of the band connections.

The next aspect to consider is the method connecting the band to the gauge. FIG. 3 is a top view of the method of sandwiching the band first end 11a between sleeve 14 and outer tube 12. Band first end 11a is folded over sleeve 14 and then sleeve 14 is slipped over outer 12. Band 11 is then fed around the tree in a clockwise manner and enters outer tube 12 in the manner shown. Band 11 then traverses through the inside of inner tube 51 and passes out into the back end of outer tube 12. In FIG. 3B band 11 terminates such that band second end 11b is shown just past thumb screw 52. Thumb screw 52 presses band 11 against the side of inner tube 51. In summary, Band 11 is now connected at two points. Band first end 11a is connected to outer tube 12 and band second end 11b is pressed against and immobilized on the inner side of inner tube 51. Any change in the length of the perimeter results in a change in the position of inner tube 51 with respect to outer tube 12.

Figure 4A:
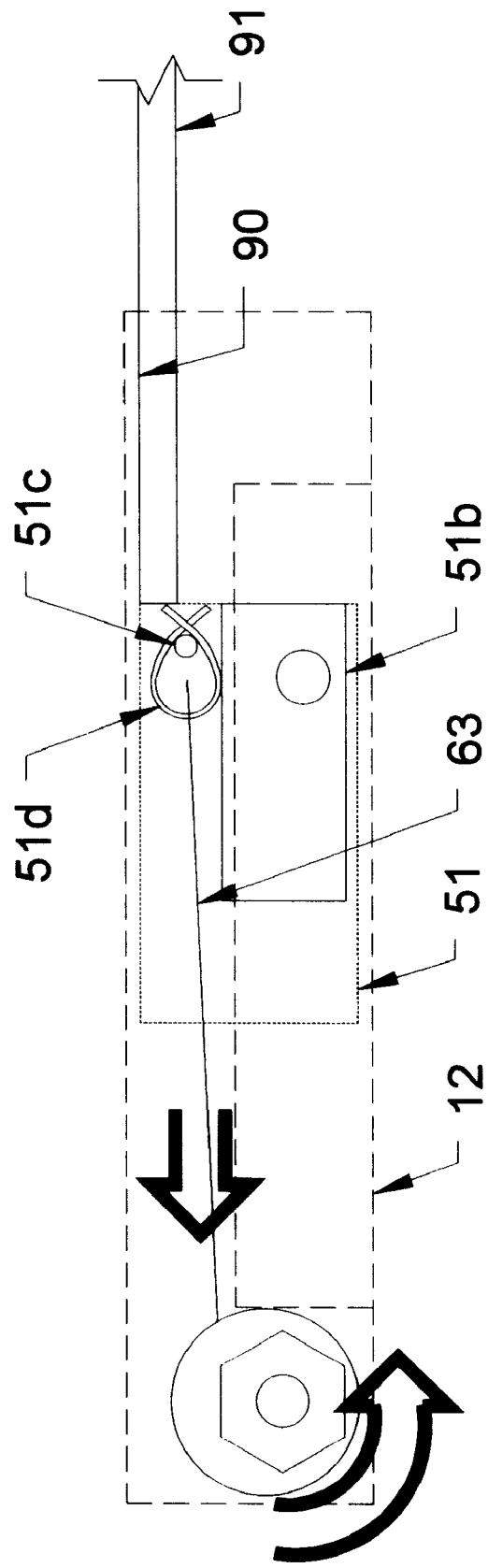
FIGS. 4A, 4B, and 4C are Side, Isometric and Top Views respectively, of Connection between Band and Constant Force Spring FIG. 5. Closeup Isometric View of Gauge Mounted on the Tree.
Figure 4B:
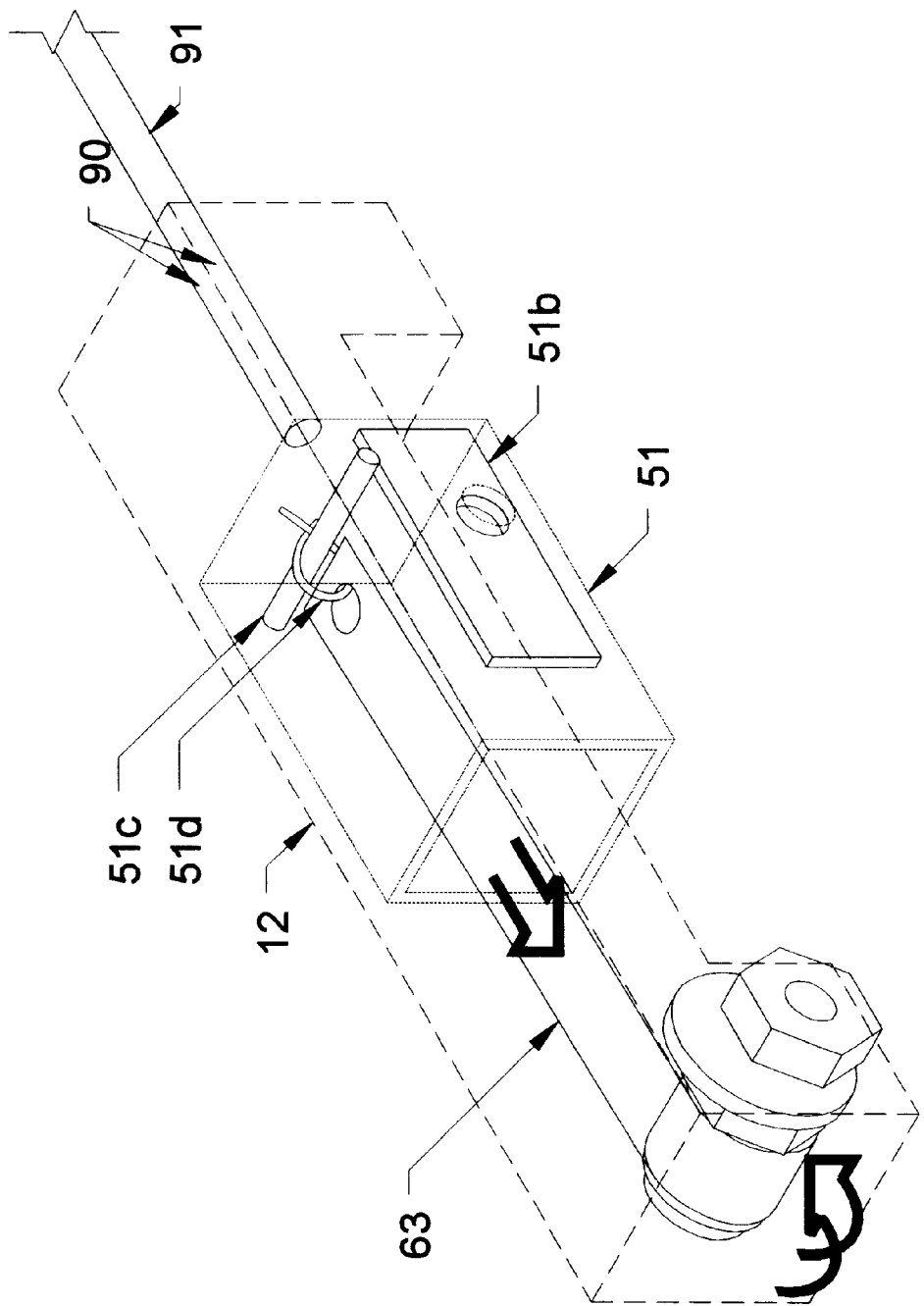
Figure 4C:
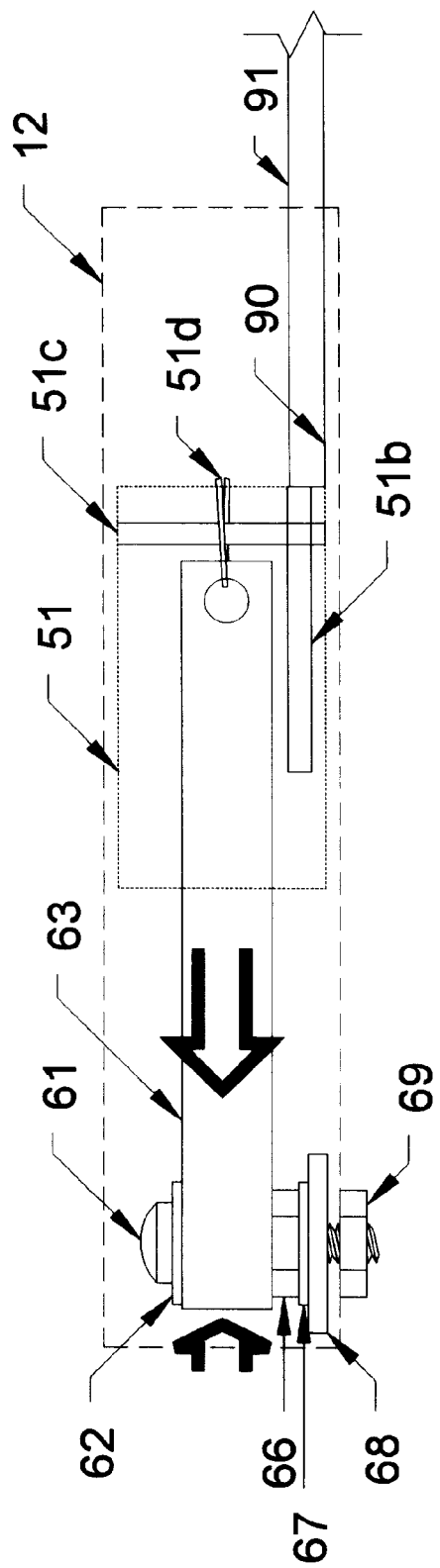

FIG. 4C shows the method for connecting spring 63 to the outer tube 12. The spring 63 is coiled around a brass ring 64, which encircles a nylon ring 65. The ring 65 is positioned around an axle screw 61, which extends through a hole in the outer tube 12. An axle washer 62 abuts the side of the spring 63, and an inner retaining nut 66, washer 67, stop washer 68, and outer retaining nut 69 are used to secure the screw 61 to the tube 12.

The next aspect to consider is the mechanism to set band tension. FIGS. 4A,4B and 4C show the method of connecting constant force spring 63 to inner tube 51. For clarity, outer tube 12 is shown only in outline form in these figures. Band retaining ring 51d passes through a hole in constant force spring 63 and at the same time passes around band retaining rod 51c. This results in a flexible linkage between constant force spring 63 and inner tube 51. A hole at the end of constant force spring 63 exerts a force (bold arrowhead pointing to the left) such that inner tube 51 is drawn towards constant force spring 63. Since band 11 is pressed against the side of inner tube 51 by thumb screw 52 (not shown in FIG. 4), tension is exerted on band 11.

The next aspect to consider is the guide for external length measuring device such as a caliper 91. FIGS. 4A,4B, and 4C show guide 90 along which a caliper rod 91 is aligned. The rod is set in the corner of outer tube 12 and the shoulder of the caliper placed at the edge of outer tube 12. The length to be measured extends from the edge of inner tube 51 to the edge of outer tube 12. Although outer tube 12 has four corners. Two of these corners are not usable because of the presence of band 11. A third corner is not usable because of the possibility of an ambiguity in the edge of inner tube 51 due to the presence of inner tube plate 51b located inside inner tube 51. The preferred corner is shown in FIG. 4B.

Figure 5:
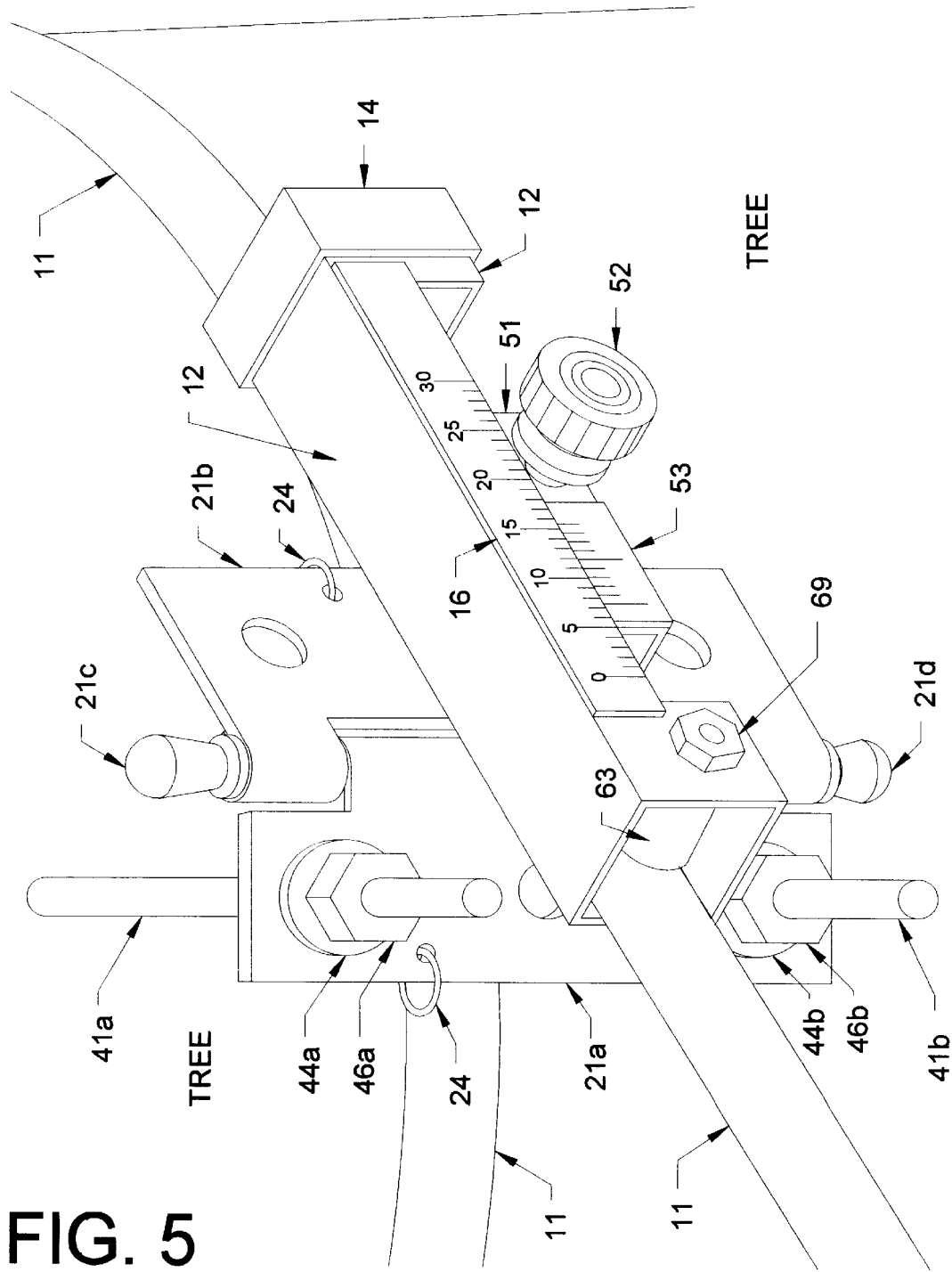

FIG. 5 shows a closeup isometric view of the gauge. The connection of band first end 11a to outer tube 12 and the connection of band 11 to inner tube 51 is not seen in this figure. The hinge spring is also not shown in this figure. The figure does indicate band 11 emerging from the back end of outer tube 12. Band second end 11b is off the figure at the lower left. FIG. 5 shows non moving scale 16 fixed on the side of outer tube 12 and moving scale 53 fixed on the side of inner tube 51. Also shown is thumb screw 52 entering the side of inner tube 51. Sleeve 14 is also shown in its operating position over outer tube 12. As the tree grows, the perimeter increase and inner tube 51 moves to the right. Constant force spring 63 reels off the axle but continues to exert a constant tension on the band. When inner tube 51 reaches the end of its traverse, thumb screw 52 is released. Inner tube 51 is moved back to left to its initial point and is then ready for the next increment of tree growth.

Figure 6:
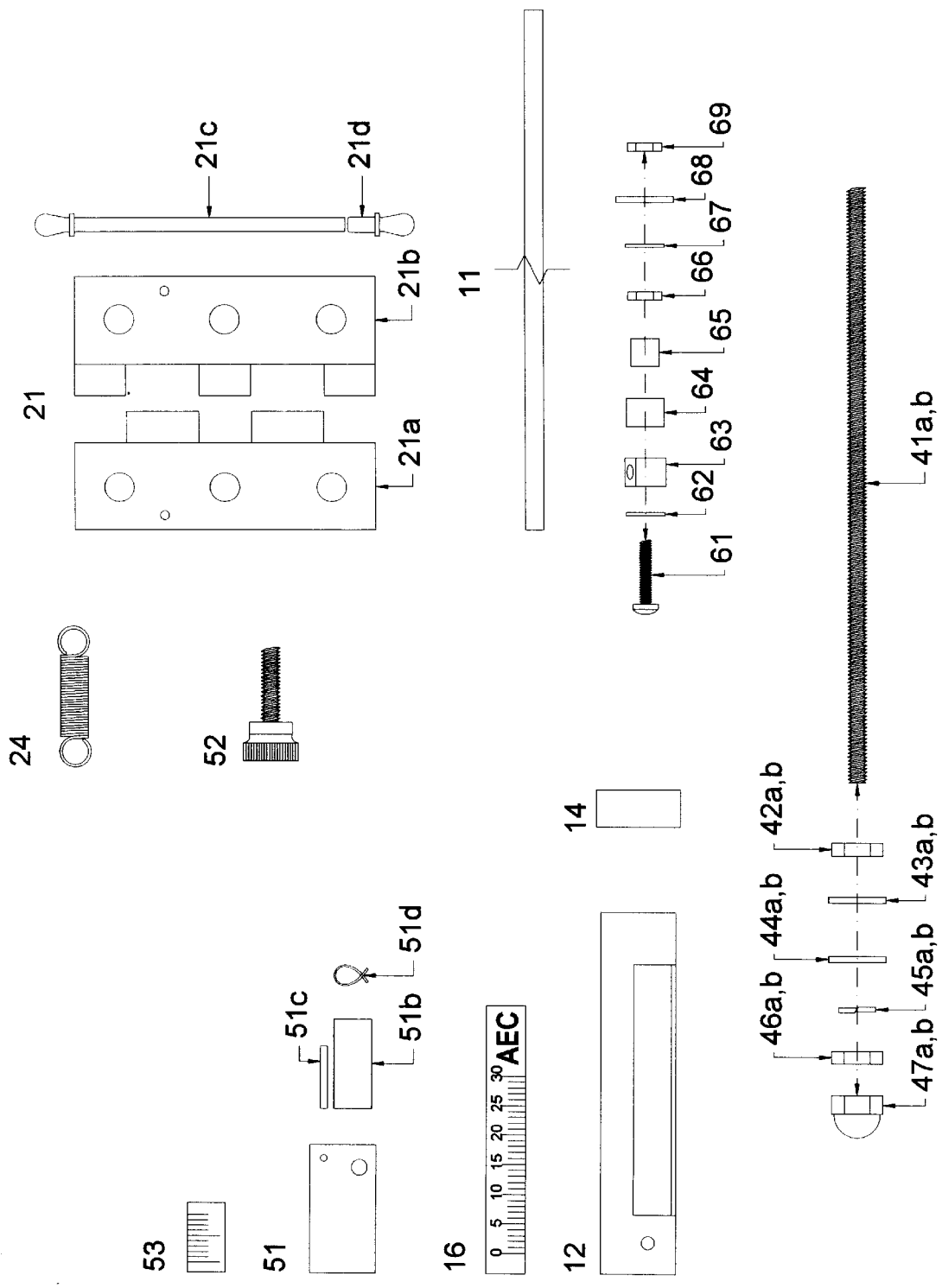
FIG. 6. Parts Description broken into Groups.

FIG. 6 shows the entire complement of parts for the gauge in groups with an exploded view of the assembly of the mounting group and an exploded view of the constant force spring group.

I claim:

1. A gauge for measuring changes in the length of a perimeter, said gauge comprising:

a hinge having a first panel and a second panel hingedly secured to said first panel, said second panel having attachment means for securing said second panel to said perimeter;

an outer member connected to said first panel;

an inner member slidable within said outer member, said outer member and said inner member having means for indicating a change in position of said inner member relative to said outer member;

a band for placement around said perimeter;

means for connecting a first portion of said band to said outer member;

means for connecting a second portion of said band to said inner member after said band is wrapped around said perimeter;

tension means for maintaining a constant tension between said inner member and said outer member; and a spring interconnecting said first panel and said second panel, wherein when said band is positioned around said perimeter and said first and second portions of said band are secured to said outer and inner members, respectively, said spring biases said outer member against said perimeter, and said tension means provides a constant tension on said band regardless of a change in the length of said perimeter.

* * * * *